United States Patent
Illarionov et al.

(10) Patent No.: US 12,364,944 B2
(45) Date of Patent: Jul. 22, 2025

(54) METHOD FOR MONITORING A REGENERATION OF A PARTICULATE FILTER IN THE EXHAUST SYSTEM OF AN INTERNAL COMBUSTION ENGINE

(71) Applicant: Volkswagen Aktiengesellschaft, Wolfsburg (DE)

(72) Inventors: Dimitri Illarionov, Neuburg an der Donau (DE); Lea Maria Lamminger, Braunschweig (DE); Lars Stratmann, Brome (DE); Christian Steinbrecher, Wismar (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/741,347

(22) Filed: Jun. 12, 2024

(65) Prior Publication Data
US 2024/0408530 A1 Dec. 12, 2024

(30) Foreign Application Priority Data
Jun. 12, 2023 (DE) ..................... 10 2023 115 280.7

(51) Int. Cl.
*B01D 46/44* (2006.01)
*B01D 46/00* (2022.01)
(Continued)

(52) U.S. Cl.
CPC ....... *B01D 46/446* (2013.01); *B01D 46/0086* (2013.01); *B01D 46/84* (2022.01);
(Continued)

(58) Field of Classification Search
CPC ........ F01N 11/002; F01N 3/035; F01N 3/208; F01N 13/009; F01N 13/10;
(Continued)

(56) References Cited

U.S. PATENT DOCUMENTS 10,156,175 B1 * 12/2018 Hattar ..................... F01N 9/002
11,105,285 B2 8/2021 Nee
(Continued)

FOREIGN PATENT DOCUMENTS

DE 60025636 T2 11/2006
DE 102018112263 A1 11/2019
(Continued)

*Primary Examiner* — Brandon D Lee
(74) *Attorney, Agent, or Firm* — Muncy, Geissler, Olds & Lowe, P.C.

(57) ABSTRACT

A method for monitoring a particulate filter in an exhaust system of an internal combustion engine. A loading of the particulate filter is determined by a differential pressure measurement between the inlet of the particulate filter and the outlet of the particulate filter. A loading of the particulate filter is modeled by a soot loading model for the particulate filter. A regeneration of the particulate filter is initiated and the particle removal is compared from the particulate filter determined through the differential pressure measurement with the particle removal modeled by the soot loading model. A fault message is initiated if a difference between the calculated particle removal and the measured particle removal exceeds a threshold value. An internal combustion engine having a control unit and an exhaust system for carrying out such a method are also provided.

20 Claims, 2 Drawing Sheets

(51) Int. Cl.
  *B01D 46/84*     (2022.01)
  *B01D 53/94*     (2006.01)
  *F01N 3/035*     (2006.01)
  *F01N 3/10*      (2006.01)
  *F01N 11/00*     (2006.01)

(52) U.S. Cl.
  CPC ..... *B01D 53/9445* (2013.01); *B01D 53/9477* (2013.01); *F01N 3/035* (2013.01); *F01N 3/101* (2013.01); *F01N 11/00* (2013.01); *B01D 2258/01* (2013.01); *B01D 2279/30* (2013.01); *F01N 2550/04* (2013.01)

(58) Field of Classification Search
  CPC ............. F01N 2550/02; F01N 2610/02; F01N 2610/1453; F01N 2900/0414; F01N 2900/1406; F01N 2560/06; F01N 2560/08; F01N 2610/00; F01N 9/005; F01N 11/005; F01N 9/002; Y02T 10/12
  See application file for complete search history.

(56) References Cited

U.S. PATENT DOCUMENTS

| | | | |
|---|---|---|---|
| 2016/0186636 A1* | 6/2016 | Odendall | F01N 9/002 73/114.76 |
| 2019/0360416 A1* | 11/2019 | Nee | F01N 13/009 |
| 2022/0056854 A1* | 2/2022 | Robel | F02B 37/24 |
| 2022/0090527 A1 | 3/2022 | Turnbull et al. | |

FOREIGN PATENT DOCUMENTS

| | | |
|---|---|---|
| DE | 102018217047 A1 | 4/2020 |
| DE | 102020103894 A1 | 8/2021 |
| DE | 102020206042 A1 | 11/2021 |
| EP | 3879085 A1 | 9/2021 |

\* cited by examiner

METHOD FOR MONITORING A REGENERATION OF A PARTICULATE FILTER IN THE EXHAUST SYSTEM OF AN INTERNAL COMBUSTION ENGINE

This nonprovisional application claims priority under 35 U.S.C. § 119 (a) to German Patent Application No. 10 2023 115 280.7, which was filed in Germany on Jun. 12, 2023, and which is herein incorporated by reference.

BACKGROUND OF THE INVENTION

Field of the Invention

The invention relates to a method for monitoring the regeneration of a particulate filter in the exhaust system of an internal combustion engine, as well as to an internal combustion engine with an exhaust system and a control unit for carrying out such a method according to the preambles of the independent claims.

Description of the Background Art

The ongoing tightening of emissions control legislation places high demands on vehicle manufacturers, which are met through corresponding measures for reducing untreated engine emissions and through corresponding exhaust-gas aftertreatment. With the introduction of the EU6 legislation level, a limit for a particle number is mandated for gasoline engines that in many cases necessitates the use of a gasoline particulate filter. Such soot particulates are produced especially after a cold start of the internal combustion engine on account of incomplete combustion in combination with a substoichiometric air-fuel ratio after the cold start, cold cylinder walls, as well as the heterogeneous mixture distribution in the combustion chambers of the internal combustion engine. In contrast to the loading of a diesel particulate filter, the soot loading of a gasoline particulate filter occurs essentially as a function of the combustion chamber temperature and decreases with increasing combustion chamber temperature. The cold start phase is thus critical for complying with the legally mandated particle limits both with respect to the particle mass and with respect to the particle number. At cold outdoor temperatures, in particular, at ambient temperatures below 0° C., especially high particulate emissions are emitted by a gasoline engine on account of the poor mixture homogenization and evaporation of the fuel as well as the starting enrichment. Moreover, a cold start with a rich, substoichiometric air-fuel ratio results in higher emissions of carbon monoxide (CO) and unburned hydrocarbons (HC), since conversion into carbon dioxide and water vapor is not yet possible on account of the cold catalytic converter. In the case of motor vehicles with a gasoline particulate filter, this gasoline particulate filter is then additionally loaded with soot during driving. This gasoline particulate filter must be regenerated continually or periodically so that the exhaust gas back pressure does not rise excessively. The rise in the exhaust gas back pressure can result in increased fuel consumption by the internal combustion engine, loss of power, and adverse effects on running smoothness to the point of engine misfiring. An adequately high temperature level in conjunction with the simultaneous presence of oxygen in the exhaust system of the internal combustion engine is necessary in order to carry out thermal oxidation with oxygen of the soot retained in the gasoline particulate filter. Since modern gasoline engines are normally operated without excess oxygen with a stoichiometric air-fuel ratio ($\lambda=1$), additional measures are necessary for this purpose. Measures that come into consideration for this purpose include, e.g., a temperature increase through an ignition timing adjustment, a temporary lean adjustment of the gasoline engine, the injection of secondary air into the exhaust system, an increase in the idle speed, or a combination of these measures. Up to now, retarded ignition timing in combination with a lean adjustment of the gasoline engine is used by preference, since this method does not require additional components and can deliver an adequate oxygen quantity at most operating points of the gasoline engine. Furthermore, the continuous monitoring of proper function of the exhaust-gas aftertreatment component as part of on-board monitoring by suitable sensors in the exhaust system may be mandated with the introduction of new, stricter exhaust emission standards.

A method for determining a state of an exhaust-gas treatment element for a motor vehicle is known from DE 10 2018 217 047 A1. In this case, the exhaust-gas treatment element has a filter with a catalytic coating. The method comprises the following steps: determining an actual value of a quantity that is representative for the storage capacity of the coating, determining a nominal value of the quantity, determining a difference between the actual value and the nominal value, and determining the state of the filter of the exhaust-gas treatment element as a function of the determined difference.

DE 10 2020 103 894 A1, which is incorporated herein by reference, describes a method for monitoring the regeneration of a particulate filter that is arranged in an exhaust system of a gasoline engine. The method comprises the following steps: determining the regeneration stage out of a defined number of regeneration stages according to which the particulate filter is being regenerated or was last regenerated; sensing a measure for at least one first test criterion that is characteristic for a change in the loading of the particulate filter; and/or testing whether the first test criterion is fulfilled, and switching into a higher regeneration stage if the first test criterion is not fulfilled, and switching into a lower regeneration stage or maintaining the current regeneration stage if the first test criterion is fulfilled.

DE 10 2020 206 042 A1 describes a method for modeling a differential pressure that drops across a particulate filter in an exhaust tract of an internal combustion engine. The method comprises the following steps: sensing at least two differential pressure values by a pressure sensor, sensing relevant associated volume flow rate values for the at least two differential pressure values; and interpolating a modeled pressure curve from the at least two sensed differential pressure values and the associated volume flow rate values.

SUMMARY OF THE INVENTION

It is therefore an object of the invention to detect an incomplete regeneration of a particulate filter in the exhaust system of a gasoline engine and to prevent repeated regeneration of the particulate filter from being initiated too often or a necessary regeneration of the particulate filter from being omitted.

The object is attained, in an example, by a method for monitoring a particulate filter in an exhaust system of an internal combustion engine. The internal combustion engine has at least one combustion chamber, at which is arranged a spark plug for igniting a combustible fuel-air mixture. The internal combustion engine additionally has a fuel injection valve for injecting a fuel into the combustion chamber and/or a fuel injection valve for injecting a fuel into an intake tract of the internal combustion engine. Preferably, the internal combustion engine has a multiplicity of combustion chambers, wherein a fuel injector for injecting a fuel into the combustion chamber and a spark plug for igniting a fuel-air mixture are arranged at each combustion chamber. The method comprises at least the following steps: determining a loading of the particulate filter by a differential pressure measurement between the inlet of the particulate filter and the outlet of the particulate filter, modeling a loading of the particulate filter by a soot loading model for the particulate filter, initiating a regeneration of the particulate filter, comparing the particle removal from the particulate filter determined through the differential pressure measurement with the particle removal modeled by the soot loading model, and issuing a fault message if a difference between the calculated particle removal and the measured particle removal exceeds a threshold value.

The method according to the invention, in particular the comparison—carried out during the regeneration of the particulate filter—of the calculated particle removal with that measured by differential pressure measurement, makes it possible to monitor the regeneration of the particulate filter and, in particular, to detect whether the model-based removal of soot corresponds to the measured removal of soot from the particulate filter. A regeneration of the particulate filter is generally associated with internal engine measures that lead to an increase in the limited pollutant emissions and/or fuel consumption. Incomplete regeneration of the particulate filter on account of an erroneous identification of the loading state and a resultant increase in emissions during operation of the internal combustion engine can be prevented by means of the method according to the invention.

In an example of the invention, provision is made that a loading model for the particulate filter on the basis of the differential pressure across the particulate filter is created. As a result, especially simple diagnosis is possible as to whether complete regeneration of the particulate filter has been achieved. In this case, the soot loading model maps an expected value for the soot loading.

A fault in the regeneration is detected if the differential pressure does not decrease during the regeneration of the particulate filter. During regeneration of the particulate filter, the differential pressure should decrease continuously as a result of the soot removal from the particulate filter and the associated decrease in the flow resistance in the particulate filter. If the differential pressure increases or remains constant at a high level during the regeneration of the particulate filter, then a fault is present, for which reason the particulate filter cannot be regenerated as desired. Such a fault can be detected reliably by the method in order to prevent further damage to the particulate filter and/or to avoid an impermissible increase in the emissions.

A regeneration of the particulate filter is not initiated until the differential pressure exceeds a threshold value. As a result, a starting signal for initiation of a regeneration of the particulate filter can be given in a simple manner. Moreover, it is possible in this way to prevent excessively frequent regenerations of the particulate filter from causing an increase in fuel consumption and/or in the emissions of the internal combustion engine.

The soot loading model can be initialized upon an exceedance of the threshold value and a subsequent initiation of a particulate filter. As a result, the loading measured by the differential pressure measurement and the loading determined through the soot loading model can be aligned so that an identification of the loading and, in particular, of the particle removal from the particulate filter during the regeneration process, is possible.

The loading of the particulate filter can be subdivided into multiple stages, wherein a regeneration of the particulate filter is initiated or prevented as a function of the stage of loading of the particulate filter that has been reached. Thus, multiple stages can be produced in the model, wherein a scarcely noticeable regeneration of the particulate filter takes place in the lowest stage, while in another stage a more intensive regeneration of the particulate filter is made possible during driving of the motor vehicle, and in the case of even higher loading, the driver can be prompted to have the particulate filter checked at a workshop.

A regeneration can also take place during normal operation of a motor vehicle. During normal operation of a motor vehicle, driving conditions can occur in which both an exhaust gas temperature sufficient for regeneration of the particulate filter and an oxygen surplus in the exhaust system are present, so that a regeneration of the particulate filter occurs. A typical example for such driving conditions is a deceleration fuel cutoff during highway travel. Such an operating situation has the result that the soot retained in the particulate filter can be oxidized without additional heating measures, and the loading of the particulate filter is reduced.

A warning message can be issued to the driver when a certain stage for the loading is exceeded. In this connection, regenerations in a lower stage occur imperceptibly to the driver. A regeneration in a higher stage, which generally takes longer and is perceptible to the driver owing to the initiation of internal engine measures, is indicated by a warning message so that the driver can link the internal engine measures to the regeneration of the particulate filter.

When a certain stage of loading is exceeded, the driver can be prompted to visit a workshop in order to carry out an external regeneration of the particulate filter. If the particulate filter reaches a critical loading stage in which an uncontrolled soot burn-off and/or a heat input to the particulate filter is impending in the event of a regeneration, which would lead to permanent thermal damage to the particulate filter, then the driver is prompted to take the motor vehicle to a workshop and have an external regeneration of the particulate filter carried out there in order to avoid permanent damage to the particulate filter.

When, during a regeneration of the particulate filter, the soot loading model can be initialized as a function of the stage of loading of the particulate filter that has been reached, and is provided with the soot loading corresponding to this stage as a starting value.

Another aspect of the invention relates to a control unit for carrying out a method described in the preceding paragraphs, wherein the control unit includes a memory unit and a computing unit as well as computer program code stored in the memory unit, wherein the method is carried out when the computer program code is executed by the computing unit.

Another aspect of the invention relates to an internal combustion engine having at least one combustion chamber, wherein a fuel injector for injecting fuel into the combustion chamber is arranged at the combustion chamber and/or a fuel injection valve is arranged in an intake tract of the internal combustion engine and a spark plug for igniting a combustible fuel-air mixture is arranged at the combustion chamber. The internal combustion engine is connected by its exhaust to an exhaust system in which a particulate filter is arranged. The internal combustion engine is additionally connected to a control unit described in the preceding paragraph. The emissions can be reduced in the case of such an internal combustion engine, since an excessively frequent or currently unnecessary regeneration of the particulate filter and an associated increase in the emissions is prevented.

A three-way catalytic converter can be arranged in the exhaust system as a first exhaust-gas aftertreatment component in the flow direction through the exhaust system of an exhaust gas flow of the internal combustion engine, and a particulate filter is arranged downstream of the three-way catalytic converter. As a result, an especially beneficial exhaust-gas aftertreatment is possible, because the three-way catalytic converter reaches its operating temperature quickly after a cold start due to the close-coupled position, and consequently permits an efficient conversion of the limited pollutants in the exhaust gas flow of the internal combustion engine immediately after a cold start of the internal combustion engine. Furthermore, this arrangement makes it possible to likewise arrange the particulate filter so as to be close-coupled, thereby simplifying a heating of the particulate filter for initiating a regeneration. A close-coupled position should be understood in this context as a position of an intake of the exhaust-gas aftertreatment component with an exhaust gas run length of less than 80 cm, preferably less than 60 cm, starting from an exhaust of the internal combustion engine.

An additional three-way catalytic converter can be arranged downstream of the particulate filter. As a result, the catalyst volume for the three-way catalytic converters can be divided between two units, by which means the close-coupled first three-way catalytic converter can be designed with a smaller volume and consequently reaches its light-off temperature faster.

The particulate filter and the additional three-way catalytic converter can also be combined in one component designed as a so-called four-way catalytic converter. To this end the particulate filter has a catalytically active coating, which preferably is applied to the filter structure of the particulate filter as a washcoat and can oxidize the limited pollutants, such as unburned hydrocarbons and carbon monoxide, as well as reduce nitrogen oxides.

The internal combustion engine can be designed as a spark-ignition internal combustion engine based on the Otto cycle and supercharged by means of an exhaust turbocharger. The filling of the combustion chambers of the internal combustion engine can be improved by supercharging of the internal combustion engine. This can result in a reduction in raw particulate emissions, especially in combination with a fuel injector, which can supply an injection pressure in the region of up to 350 bar, and thereby reduce the frequency with which a particulate filter must be regenerated.

The various examples and embodiments of the invention cited in this application can be combined with one another.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
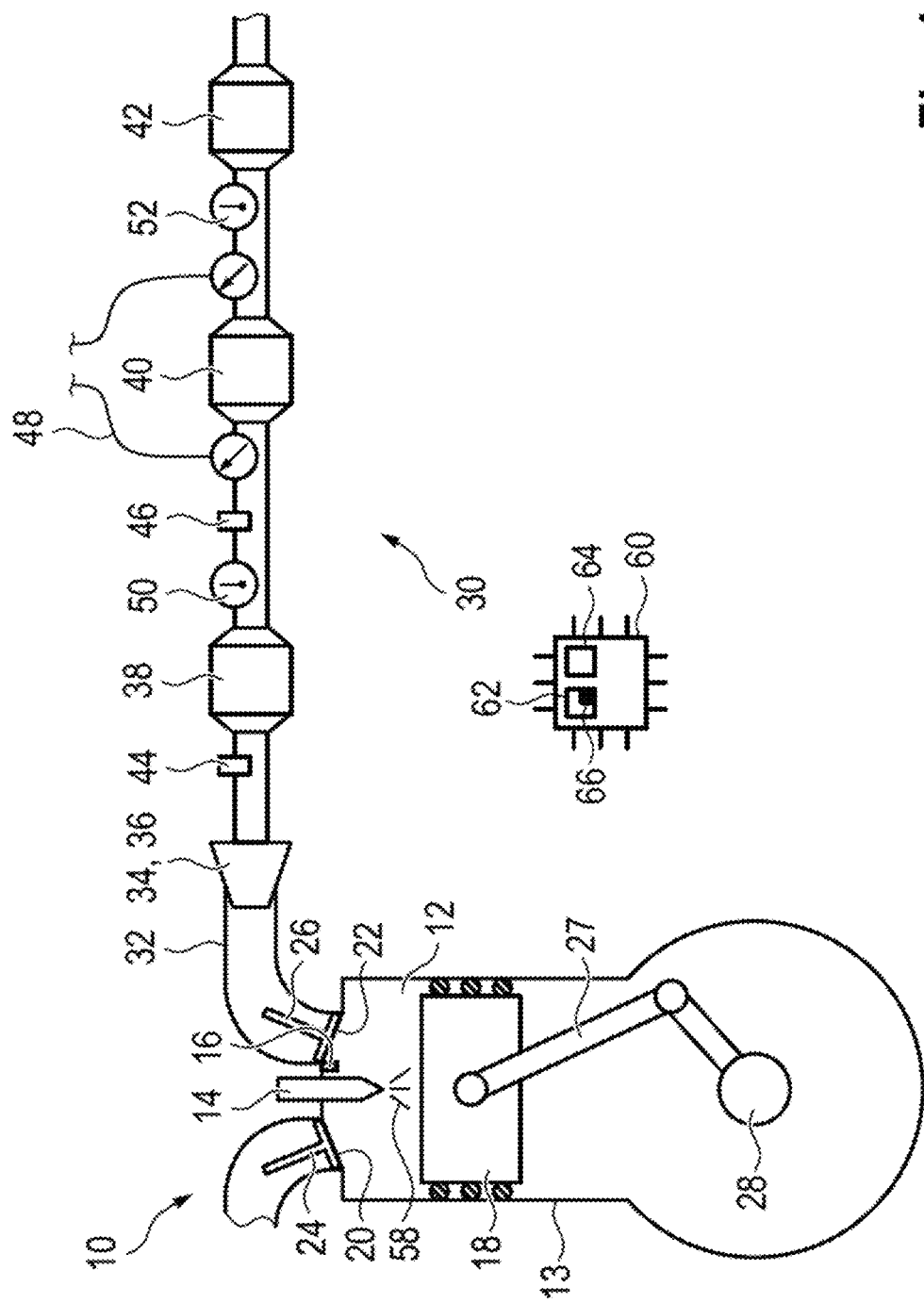
FIG. 1 shows an example of an internal combustion engine having an exhaust system and a control unit for carrying out a method according to the invention for monitoring a particulate filter in the exhaust system of the internal combustion engine.

FIG. 1 shows a schematic representation of an internal combustion engine 10. The internal combustion engine 10 is designed as a direct injection gasoline engine. The internal combustion engine 10 has multiple combustion chambers 12. Arranged at each of the combustion chambers 12 are a fuel injector with a fuel injection valve 14 for injecting a fuel 58 into the respective combustion chamber 12 as well as a spark plug 16 for igniting a fuel-air mixture in the respective combustion chamber 12. The combustion chamber 12 is delimited by a piston 18 that is movable in an axial direction. The oscillating motion of the piston 18 is converted by a connecting rod 27 into a rotary motion of a crankshaft 28 of the internal combustion engine. The internal combustion engine 10 is connected by its intake 20 to an air supply system (not shown) and by its exhaust 22 to an exhaust system 30. Arranged at the combustion chambers 12 are intake valves 24 and exhaust valves 26, with which a fluidic connection from the air supply system to the combustion chambers 12 or from the combustion chambers 12 to the exhaust system 30 can be opened or closed. Alternatively or in addition, the internal combustion engine 10 can also have one or more fuel injection valve(s) 14 that are arranged in an intake tract of the internal combustion engine 10.

The exhaust system 30 includes an exhaust passage 32, in which are arranged a close-coupled three-way catalytic converter 38 as a first exhaust-gas aftertreatment component in the flow direction of an exhaust gas flow of the internal combustion engine 10, a particulate filter 40 downstream of the close-coupled three-way catalytic converter 38, and a second three-way catalytic converter 42 further downstream, wherein the second three-way catalytic converter 42 is preferably arranged in an underfloor position of a motor vehicle. Furthermore, a turbine 36 of an exhaust turbocharger 34 can be arranged in the exhaust system 30. A first lambda probe 44, in particular a broadband sensor, for sensing the oxygen concentration in the exhaust gas flow is arranged in the exhaust system downstream of the exhaust 22 of the internal combustion engine 10 and upstream of the first three-way catalytic converter 38. A second lambda probe 46, in particular a two-step sensor, is arranged downstream of the first three-way catalytic converter 38 and upstream of the second three-way catalytic converter 42, in particular downstream of the first three-way catalytic converter 38 and upstream of the particulate filter 40. Furthermore, a first temperature sensor 50 is arranged in the exhaust system 30 downstream of the first three-way catalytic converter 38 and upstream of the particulate filter 40, and a second temperature sensor 52 is arranged downstream of the particulate filter 40 and upstream of the second three-way catalytic converter. Provided on the particulate filter 40 is a differential pressure sensor 48, which identifies a pressure difference between an inlet of the particulate filter 40 and an outlet of the particulate filter 40. The pressure difference across the particulate filter 40 correlates with the particle loading of the particulate filter 40, wherein a regeneration of the particulate filter 40 is initiated when a defined threshold value for the differential pressure is reached in order to avoid further loading and an associated, potential damage to the particulate filter 40.

The internal combustion engine 10 is connected to a control unit 60, which includes a memory unit 62 and a computing unit 64. Stored in the memory unit 62 is computer program code 66, which carries out a method according to the invention upon execution by the computing unit of the control unit.

Figure 2:
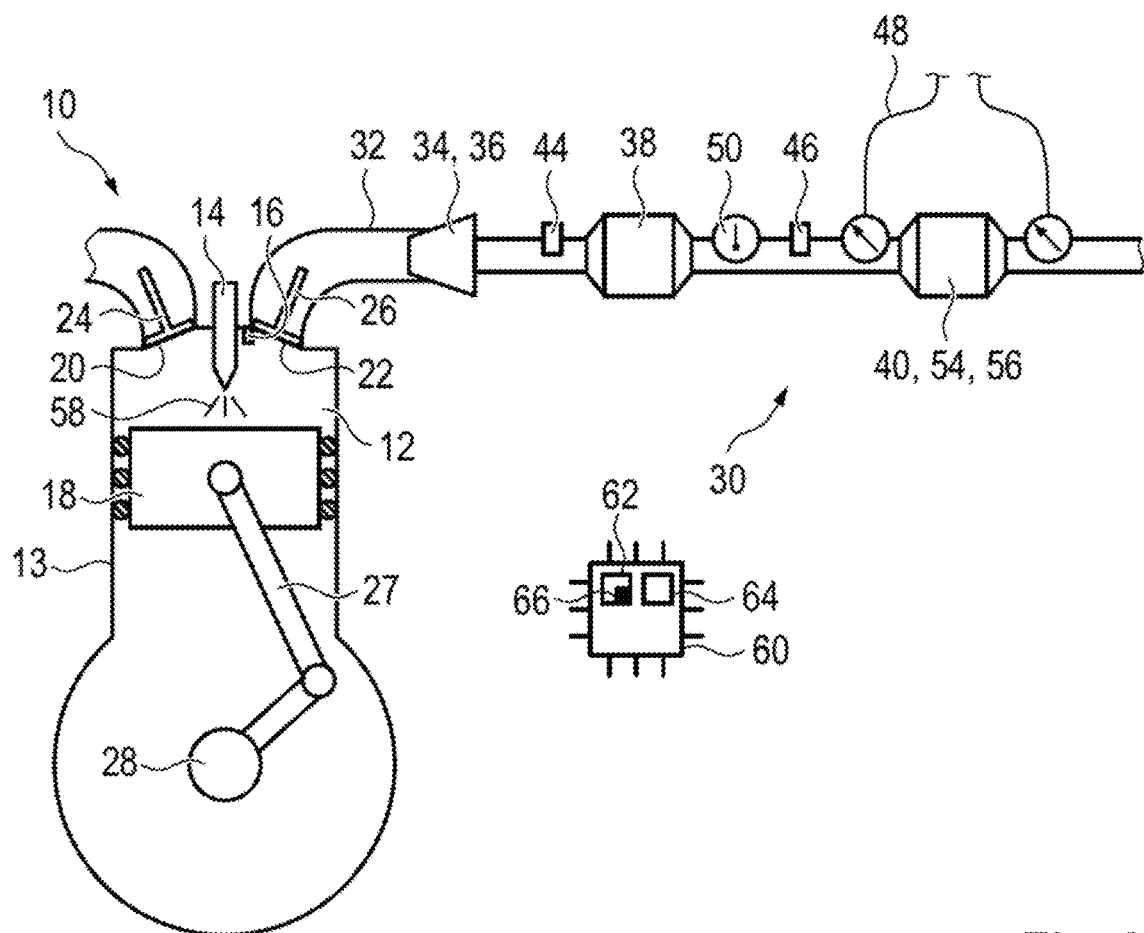
FIG. 2 shows an example of an internal combustion engine for carrying out a method according to the invention for monitoring a particulate filter in the exhaust system of the internal combustion engine.

Another preferred exemplary embodiment of an internal combustion engine 10 is shown in FIG. 2. The internal combustion engine 10 is designed as a direct injection gasoline engine. The internal combustion engine 10 has multiple combustion chambers 12. Arranged at each of the combustion chambers 12 are a fuel injector with a fuel injection valve 14 for injecting a fuel 58 into the respective combustion chamber 12 as well as a spark plug 16 for igniting a fuel-air mixture in the respective combustion chamber 12. The combustion chamber 12 is delimited by a piston 18 that is movable in an axial direction. The oscillating motion of the piston 18 is converted by a connecting rod 27 into a rotary motion of a crankshaft 28 of the internal combustion engine. The internal combustion engine 10 is connected by its intake 20 to an air supply system (not shown) and by its exhaust 22 to an exhaust system 30. Arranged at the combustion chambers 12 are intake valves 24 and exhaust valves 26, with which a fluidic connection from the air supply system to the combustion chambers 12 or from the combustion chambers 12 to the exhaust system 30 can be opened or closed. Alternatively or in addition, the internal combustion engine 10 can also have one or more fuel injection valve(s) 14 that are arranged in an intake tract of the internal combustion engine 10.

The exhaust system 30 includes an exhaust passage 32, in which are arranged a close-coupled three-way catalytic converter 38 as a first exhaust-gas aftertreatment component in the flow direction of an exhaust gas flow of the internal combustion engine 10, and a particulate filter 40 with a catalytically active coating 54 downstream of the close-coupled three-way catalytic converter 38. The particulate filter 40 can be designed, in particular, as a so-called four-way catalytic converter 56, wherein such a four-way catalytic converter combines the functionality of a three-way catalytic converter 42 and a particulate filter 40 in one component. In this case, the filter substrate of the particulate filter 40 is covered with a washcoat that has the functionality of a three-way catalytic converter 42. Furthermore, a turbine 36 of an exhaust turbocharger 34 can be arranged in the exhaust system 30. A first lambda probe 44, in particular a broadband sensor, for sensing the oxygen concentration in the exhaust gas flow is arranged in the exhaust system downstream of the exhaust 22 of the internal combustion engine 10 and upstream of the first three-way catalytic converter 38. A second lambda probe 46, in particular a two-step sensor, is arranged downstream of the first three-way catalytic converter 38 and upstream of the particulate filter 40.

Furthermore, a first temperature sensor 50 is arranged in the exhaust system 30 downstream of the first three-way catalytic converter 38 and upstream of the particulate filter 40. Provided on the particulate filter 40 is a differential pressure sensor 48, which identifies a pressure difference between an inlet of the particulate filter 40 and an outlet of the particulate filter 40. The pressure difference across the particulate filter 40 correlates with the particle loading of the particulate filter 40, wherein a regeneration of the particulate filter 40 is initiated when a defined threshold value for the differential pressure is reached in order to avoid further loading and an associated, potential damage to the particulate filter 40.

The internal combustion engine 10 is connected to a control unit 60, which includes a memory unit 62 and a computing unit 64. Stored in the memory unit 62 is computer program code 66, which carries out a method according to the invention upon execution by the computing unit of the control unit.

Figure 3:
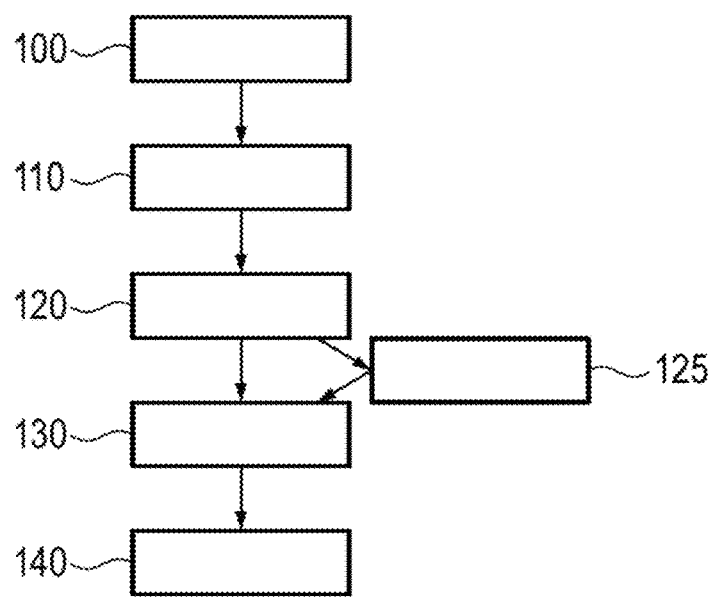
FIG. 3 shows a flowchart for carrying out an example method according to the invention for monitoring a particulate filter in the exhaust system of an internal combustion engine.

Shown in FIG. 3 is a flowchart for carrying out a method according to the invention for monitoring a particulate filter in the exhaust system of an internal combustion engine. In a first method step <100> here, a differential pressure across the particulate filter 40 between the inlet of the particulate filter 40 and the outlet of the particulate filter 40 is determined, which correlates with a loading of the particulate filter.

In a method step <110>, a loading of the particulate filter 40 is additionally modeled by a soot loading model for the particulate filter 40.

In a method step <120>, a regeneration of the particulate filter 40 is initiated when the differential pressure exceeds a predefined threshold value that signals the necessity of a regeneration of the particulate filter 40. Such an initiation of a regeneration is accomplished through a raising of the exhaust gas temperature to a regeneration temperature of the particulate filter. The raising of the exhaust gas temperature can be accomplished by internal engine heating measures such as, e.g., an adjustment of the ignition timing in the retarded direction and/or by external heating measures, for example by an electric heating element in the exhaust system or an exhaust gas burner, wherein the external heating means is arranged upstream of the particulate filter 40.

In a method step <130>, the particle removal from the particulate filter determined through the differential pressure measurement during the regeneration of the particulate filter 40 is compared with the particle removal modeled by the soot loading model. In this context, the soot loading model can be initialized in a method step <125> when the regeneration of the particulate filter 40 is started in order to improve the accuracy of the method.

In a method step <140>, a fault message is issued if a difference between the calculated particle removal and the measured particle removal exceeds a threshold value.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for monitoring a regeneration of a particulate filter in an exhaust system of an internal combustion engine, the internal combustion engine comprising at least one combustion chamber, at which is arranged a spark plug for igniting a combustible fuel-air mixture, the internal combustion engine has a fuel injection valve for feeding a fuel into the internal combustion engine, the method comprising:

determining a loading of the particulate filter by a differential pressure measurement between an inlet of the particulate filter and an outlet of the particulate filter;

modeling a loading of the particulate filter by a soot loading model for the particulate filter;

initiating a regeneration of the particulate filter, said regeneration of the particulate filter not being initiated until the differential pressure exceeds a threshold value;

comparing a measured particle removal from the particulate filter determined through the differential pressure measurement with a calculated particle removal modeled by the soot loading model; and issuing a fault message when a difference between the calculated particle removal and the measured particle removal exceeds a threshold value.

2. The method according to claim 1, wherein the soot loading model for the soot particulate filter on the basis of the determined differential pressure across the soot particulate filter is created.

3. The method according to claim 1, wherein a fault in the regeneration is detected if the differential pressure does not decrease during the regeneration of the particulate filter.

4. The method according to claim 1, wherein the soot loading model is initialized upon an exceedance of the threshold value and a subsequent initiation of a particulate filter.

5. The method according to claim 1, wherein the soot loading model is initialized as a function of the stage of loading that has been reached, and is provided with the soot loading corresponding to this stage as a starting value.

6. A control unit to perform the method according to claim 1, wherein the control unit comprises:
a memory;
a processor; and
computer program code stored in the memory, wherein the method is carried out when the computer program code is executed by the processor.

7. The method according to claim 1, further comprising measuring, using a differential pressure sensor, a differential pressure difference between the inlet of the particulate filter and the outlet of the particulate filter.

8. The method according to claim 1, wherein said initiating the regeneration of the particulate filter comprises raising an exhaust temperature to a regeneration temperature of the particulate filter.

9. The method according to claim 8, wherein said raising the exhaust temperature comprises an adjustment of the ignition timing.

10. The method according to claim 8, wherein said raising the exhaust temperature is accomplished by an external heating means arranged upstream from the particulate filter.

11. A method for monitoring a regeneration of a particulate filter in an exhaust system of an internal combustion engine, the internal combustion engine comprising at least one combustion chamber, at which is arranged a spark plug for igniting a combustible fuel-air mixture, the internal combustion engine has a fuel injection valve for feeding a fuel into the internal combustion engine the method comprising:

determining a loading of the particulate filter by a differential pressure measurement between an inlet of the particulate filter and an outlet of the particulate filter, the loading of the particulate filter comprising subdividing the loading of the particulate filter into multiple stages;

modeling a loading of the particulate filter by a soot loading model for the particulate filter;

initiating a regeneration of the particulate filter as a function of a stage of loading of the particulate filter that has been reached;

comparing the particle removal from the particulate filter determined through the differential pressure measurement with the particle removal modeled by the soot loading model; and issuing a fault message if a difference between the calculated particle removal and the measured particle removal exceeds a threshold value.

12. The method according to claim 11, wherein a warning message is issued to the driver when a certain stage is exceeded.

13. The method according to claim 11, wherein the driver is prompted to visit a workshop in order to carry out an external regeneration of the particulate filter when a certain stage of loading is exceeded.

14. A control unit to perform the method according to claim 11, wherein the control unit comprises:
a memory;
a processor; and
computer program code stored in the memory, wherein the method is carried out when the computer program code is executed by the processor.

15. An internal combustion engine comprising:
a combustion chamber;
a fuel injection valve arranged at the combustion chamber to inject a fuel into the combustion chamber; and
a spark plug to ignite a combustible fuel-air mixture,
wherein the internal combustion engine is connected by its exhaust to an exhaust system in which a particulate filter is arranged and is connected to the control unit according to claim 6.

16. The internal combustion engine according to claim 15, wherein a three-way catalytic converter is arranged in the exhaust system as a first exhaust-gas aftertreatment component in the flow direction through the exhaust system of an exhaust gas flow of the internal combustion engine, and wherein a particulate filter is arranged downstream of the three-way catalytic converter.

17. The internal combustion engine according to claim 16, wherein an additional three-way catalytic converter is arranged downstream of the particulate filter.

18. The internal combustion engine according to claim 15, wherein the particulate filter has a catalytically active coating.

19. The internal combustion engine according to claim 15, wherein the internal combustion engine a direct injection gasoline engine supercharged by an exhaust turbocharger.

20. An internal combustion engine comprising:
a combustion chamber;
a fuel injection valve arranged at the combustion chamber to inject a fuel into the combustion chamber; and
a spark plug to ignite a combustible fuel-air mixture,
wherein the internal combustion engine is connected by its exhaust to an exhaust system in which a particulate filter is arranged and is connected to the control unit according to claim 14.

* * * * *